(12) United States Patent
Ozturk et al.

(10) Patent No.: US 10,349,440 B2
(45) Date of Patent: Jul. 9, 2019

(54) FEEDBACK MECHANISM TO ACTIVATE AND/OR DEACTIVATE A SEMI-PERSISTENT SCHEDULING GRANT

(71) Applicant: QUALCOMM Incorporated, San Diego, CA (US)

(72) Inventors: Ozcan Ozturk, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/481,387

(22) Filed: Apr. 6, 2017

(65) Prior Publication Data

US 2017/0295594 A1 Oct. 12, 2017

Related U.S. Application Data

(60) Provisional application No. 62/320,870, filed on Apr. 11, 2016.

(51) Int. Cl.
*H04L 5/00* (2006.01)
*H04W 72/04* (2009.01)
(Continued)

(52) U.S. Cl.
CPC .......... *H04W 72/14* (2013.01); *H04L 5/0053* (2013.01); *H04W 72/0413* (2013.01);
(Continued)

(58) Field of Classification Search
CPC ............ H04L 5/0053; H04W 72/0413; H04W 72/1289; H04W 72/14; H04W 76/27; H04W 88/02; H04W 88/08
See application file for complete search history.

(56) References Cited

U.S. PATENT DOCUMENTS 6,351,073 B1 * 2/2002 Rapeanu ............... H02M 1/36
315/307
6,619,185 B2 * 9/2003 Gutsche ............... F15B 20/00
91/445
(Continued)

FOREIGN PATENT DOCUMENTS

CN 102025467 A * 4/2011 ........... H04L 1/0025
CN 102025467 B * 5/2013 ........... H04L 1/0025
(Continued)

OTHER PUBLICATIONS

Ericsson: "Skipping Padding in SPS- and Dynamic Grants", 3GPP TSG-RAN WG2 #91 bis, R2-154742, Oct. 4, 2015, XP051005231, Retrieved from the Internet: URL:http://www.3gpp.org/ftp/Meetings_3GPP SYNC/RAN2/Docs/, 4 pages.
(Continued)

*Primary Examiner* — Eric Nowlin
(74) *Attorney, Agent, or Firm* — Arent Fox, LLP

(57) ABSTRACT

The present disclosure may provide a feedback mechanism in which a feedback PDU may be transmitted by a UE with one or more modified transmission characteristics for both an activation and deactivation of the SPS grant. The feedback PDU transmitted with modified transmission characteristics may increase the reliability of the communication system and reduce the latency of the communication system, while also activating and/or deactivating SPS grants. In an aspect of the disclosure, a method, a computer-readable medium, and an apparatus are provided. The apparatus may generate a feedback PDU. In addition, the apparatus may modify a transmission characteristic associated with the feedback PDU. Furthermore, the apparatus may transmit, using the modified transmission characteristic, the feedback PDU to the base station.

30 Claims, 11 Drawing Sheets

(51) Int. Cl.
*H04W 72/12* (2009.01)
*H04W 72/14* (2009.01)
*H04W 76/27* (2018.01)
*H04W 88/02* (2009.01)
*H04W 88/08* (2009.01)

(52) U.S. Cl.
CPC ....... *H04W 72/1289* (2013.01); *H04W 76/27* (2018.02); *H04W 88/02* (2013.01); *H04W 88/08* (2013.01)

(56) References Cited

U.S. PATENT DOCUMENTS

| | | | | |
|---|---|---|---|---|
| 7,415,041 | B2* | 8/2008 | Harris | H04W 52/262 370/338 |
| 8,041,330 | B1* | 10/2011 | Garin | H04W 4/90 455/404.1 |
| 8,194,558 | B2* | 6/2012 | Choi | H04L 1/0016 370/252 |
| 8,223,646 | B2* | 7/2012 | Cai | H04W 72/042 370/235 |
| 8,320,319 | B2* | 11/2012 | Lohr | H04W 72/042 370/329 |
| 8,335,959 | B2* | 12/2012 | Cai | H04L 1/1887 714/748 |
| 8,385,241 | B2* | 2/2013 | Yu | H04W 72/042 370/311 |
| 8,423,856 | B2* | 4/2013 | Cai | H04L 1/1896 370/329 |
| 8,432,845 | B2* | 4/2013 | Yu | H04W 72/042 370/311 |
| 8,503,380 | B2* | 8/2013 | Meyer | H04L 1/1812 370/329 |
| 8,555,126 | B2* | 10/2013 | Lohr | H04W 72/042 714/748 |
| 8,611,221 | B2* | 12/2013 | Cai | H04W 72/042 370/235 |
| 8,689,073 | B2* | 4/2014 | Cai | H04L 1/1887 714/748 |
| 8,743,795 | B2* | 6/2014 | Yu | H04L 1/00 370/329 |
| 8,879,454 | B2* | 11/2014 | Yu | H04W 72/042 370/311 |
| 8,908,630 | B2* | 12/2014 | Meyer | H04L 1/1812 370/329 |
| 9,042,327 | B2* | 5/2015 | Yang | H04L 1/1825 370/329 |
| 9,172,495 | B1* | 10/2015 | Shah | H04L 1/0005 |
| 9,178,667 | B2* | 11/2015 | Hsu | H04L 1/1893 |
| 9,247,536 | B2* | 1/2016 | Yang | H04L 1/1825 |
| 9,380,593 | B2* | 6/2016 | Wang | H04W 76/00 |
| 9,445,365 | B2* | 9/2016 | Makharia | H04W 52/0216 |
| 9,532,368 | B2* | 12/2016 | Meyer | H04L 1/1812 |
| 9,634,818 | B2* | 4/2017 | Fan | H04L 1/1854 |
| 9,635,616 | B2* | 4/2017 | Makharia | H04W 52/0216 |
| 9,681,430 | B2* | 6/2017 | Rune | H04L 1/0003 |
| 9,736,826 | B2* | 8/2017 | Yang | H04L 1/1825 |
| 9,844,045 | B2* | 12/2017 | Park | H04W 72/042 |
| 9,888,486 | B2* | 2/2018 | Meyer | H04W 72/12 |
| 9,936,489 | B2* | 4/2018 | Yang | H04L 1/1825 |
| 9,973,315 | B2* | 5/2018 | Han | H04L 5/0053 |
| 2006/0146757 | A1* | 7/2006 | Harris | H04L 1/1812 370/335 |
| 2010/0002675 | A1* | 1/2010 | Fu | H04L 5/0007 370/343 |
| 2010/0111026 | A1* | 5/2010 | Hsu | H04L 1/1893 370/329 |
| 2010/0118807 | A1 | 5/2010 | Seo et al. | |
| 2010/0309793 | A1* | 12/2010 | Choi | H04L 1/0016 370/252 |
| 2011/0223924 | A1* | 9/2011 | Lohr | H04W 72/042 455/450 |
| 2012/0113907 | A1* | 5/2012 | Baldemair | H04W 52/146 370/329 |
| 2013/0016655 | A1* | 1/2013 | Heo | H04L 5/001 370/328 |
| 2013/0242923 | A1* | 9/2013 | Yang | H04L 1/1825 370/329 |
| 2015/0230239 | A1* | 8/2015 | Yang | H04L 1/1825 370/329 |
| 2015/0245326 | A1* | 8/2015 | Rune | H04L 1/0003 370/329 |
| 2016/0080043 | A1* | 3/2016 | Tian | H04B 7/022 375/267 |
| 2016/0087772 | A1* | 3/2016 | Yang | H04L 1/1825 370/329 |
| 2016/0278075 | A1* | 9/2016 | Yang | H04L 1/1825 |
| 2016/0302200 | A1* | 10/2016 | Yang | H04W 72/0446 |
| 2017/0019887 | A1* | 1/2017 | Jiang | H04W 72/042 |
| 2017/0230997 | A1* | 8/2017 | Damnjanovic | H04L 5/005 |
| 2017/0273083 | A1* | 9/2017 | Chen | H04L 1/0071 |
| 2017/0295594 | A1* | 10/2017 | Ozturk | H04W 72/1289 |
| 2017/0311292 | A1* | 10/2017 | Choi | H04W 72/04 |
| 2018/0006781 | A1* | 1/2018 | Choi | H04L 5/0041 |
| 2018/0048436 | A1* | 2/2018 | Park | H04L 5/0007 |
| 2018/0049073 | A1* | 2/2018 | Dinan | H04W 72/1242 |
| 2018/0049224 | A1* | 2/2018 | Dinan | H04W 72/1242 |
| 2018/0124788 | A1* | 5/2018 | Choi | H04W 72/0453 |
| 2018/0160445 | A1* | 6/2018 | Babaei | H04W 72/14 |
| 2019/0007176 | A1* | 1/2019 | Ozturk | H04L 1/1812 |

FOREIGN PATENT DOCUMENTS

WO WO-2011079774 A1 * 7/2011 ........... H04L 1/0025
WO WO-2017180481 A1 * 10/2017 ........ H04W 72/1289

OTHER PUBLICATIONS

International Search Report and Written Opinion—PCT/US2017/026699—ISA/EPO—dated Jul. 13, 2017.
LG Electronics Inc: "SPS Feedback Transmission", 3GPP TSG-RAN WG2 Meeting #93bis, R2-162902, Apr. 2, 2016, XP051082632, Retrieved from the Internet: URL:http://www.3gpp.org/ftp/tsg_ran/WG2_RL2/TSGR2_93bis/Docs/, 3 pages.
Qualcomm Incorporated: "Open Issues for Skipping UL Grants", 3GPP TSG-RAN2 Meeting #93bis, R2-162909, Apr. 2, 2016, XP051082639, Retrieved from the Internet: URL:http://www.3gpp.org/ftp/tsg_ran/WG2_RL2/TSGR2_93bis/Docs/, 2 pages.

* cited by examiner

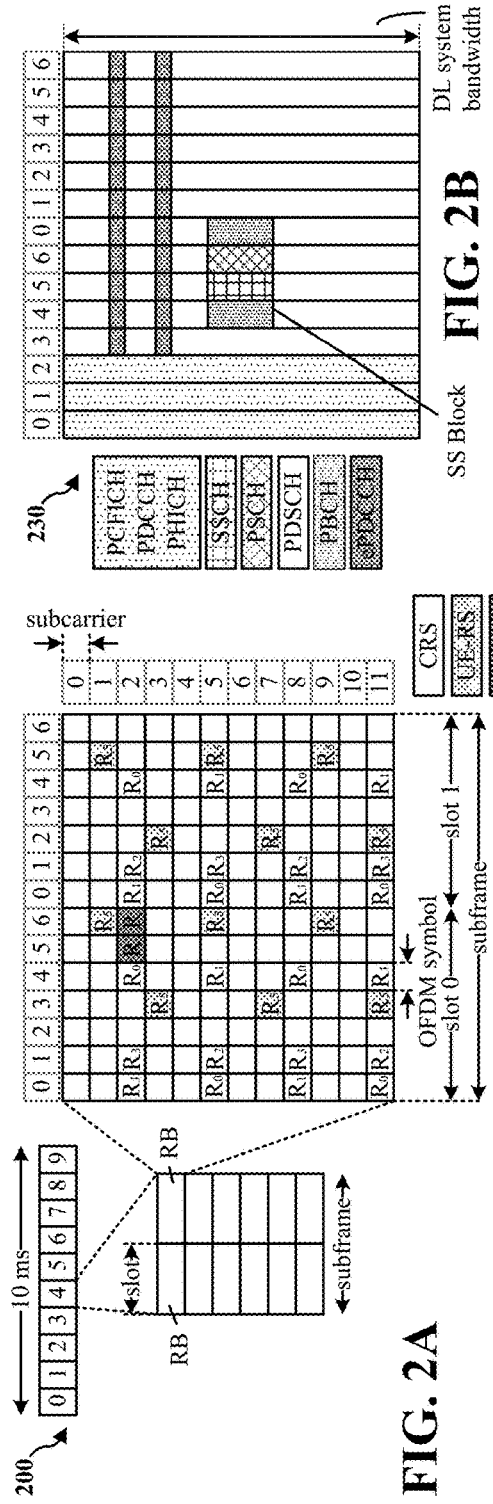
FIG. 2A
FIG. 2B
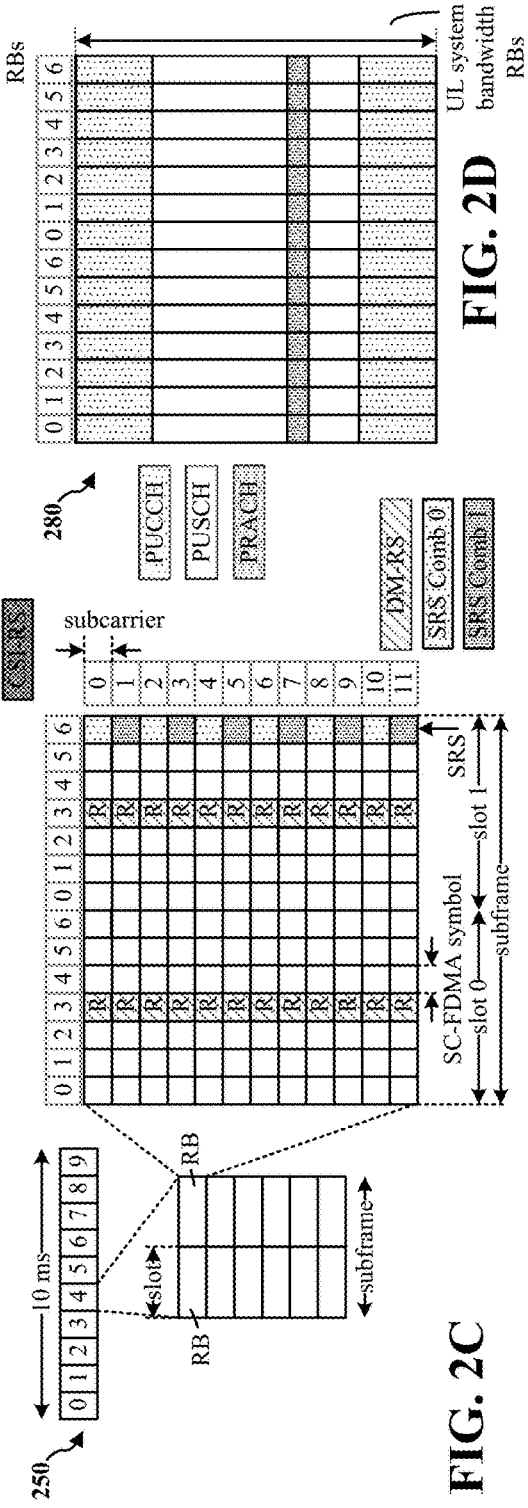
FIG. 2C
FIG. 2D

FEEDBACK MECHANISM TO ACTIVATE AND/OR DEACTIVATE A SEMI-PERSISTENT SCHEDULING GRANT

CROSS-REFERENCE TO RELATED APPLICATION(S)

This application claims the benefit of U.S. Provisional Application Ser. No. 62/320,870, entitled "FEEDBACK MECHANISM TO ACTIVATE AND/OR DEACTIVATE A SEMI-PERSISTENT SCHEDULING GRANT" and filed on Apr. 11, 2016, which is expressly incorporated by reference herein in its entirety.

BACKGROUND

Field

The present disclosure relates generally to communication systems, and more particularly, to a feedback mechanism to activate and/or deactivate a semi-persistent scheduling (SPS) grant.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In conventional communication systems, a user equipment (UE) may be allocated resources for uplink (UL) transmissions through an SPS grant received from a base station. Current feedback mechanisms for the activation and/or deactivation of SPS grants may reduce the reliability and increase the latency of the system.

There is a need for a feedback mechanism to activate and/or deactivate SPS grants, and that also increases the reliability of the system and reduces the latency of the system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In conventional communication systems, a UE may be allocated resources for UL transmissions through an SPS grant received from an base station. The SPS grant may allocate the resources to the UE with an SPS periodicity. In other words, the UE may use the allocated resources at predetermined intervals (e.g., an SPS periodicity) until the SPS grant is deactivated. When the UE does not have any data to send using the allocated resources, the UE may skip transmitting data (e.g., UL skipping) and also skip sending a feedback PDU using the allocated resources in order to reduce the UL interference of the system. When a UE skips sending a feedback PDU, base station implementation may be used to determine if the SPS grant should be deactivated (e.g., the UE does not have any data to send) or if the UE did not receive the SPS grant. Relying on base station implementation to determine if the SPS grant should be deactivated or if the UE did not receive the SPS grant may reduce the reliability of the system.

Conversely, when the UE does have data to transmit using the allocated resources, the UE may transmit a feedback PDU in the form of an acknowledgement. In conventional communications systems, the acknowledgement feedback PDU may be transmitted using the same transmission characteristics as a data transmission associated with the SPS grant. However, by using the same transmission characteristics, the feedback PDU (e.g., acknowledgement) may not be transmitted successfully at the first attempt, and hence may increase the latency of the system due to retransmissions of the feedback PDU.

There is a need for a feedback mechanism to activate and/or deactivate SPS grants, and that also increases the reliability of the system and reduces the latency of the system.

The present disclosure may provide a solution to the problem by providing a feedback mechanism in which a feedback PDU may be transmitted by the UE with modified transmission characteristics for both an activation and deactivation of the SPS grant. The feedback PDU with modified transmission characteristics may increase the reliability of the system and reduce the latency of the system, while also activating and/or deactivating SPS grants.

In an aspect of the disclosure, a method, a computer-readable medium, and an apparatus are provided. The apparatus may generate a feedback PDU. In addition, the apparatus may modify a transmission characteristic associated with the feedback PDU. Furthermore, the apparatus may transmit, using the modified transmission characteristic, the feedback PDU to the base station.

In another aspect, the apparatus may transmit an SPS grant to a UE. The apparatus also may receive, from the UE, a feedback PDU with a modified transmission characteristic. Furthermore, the apparatus may activate or deactivate the SPS grant when the feedback PDU is received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
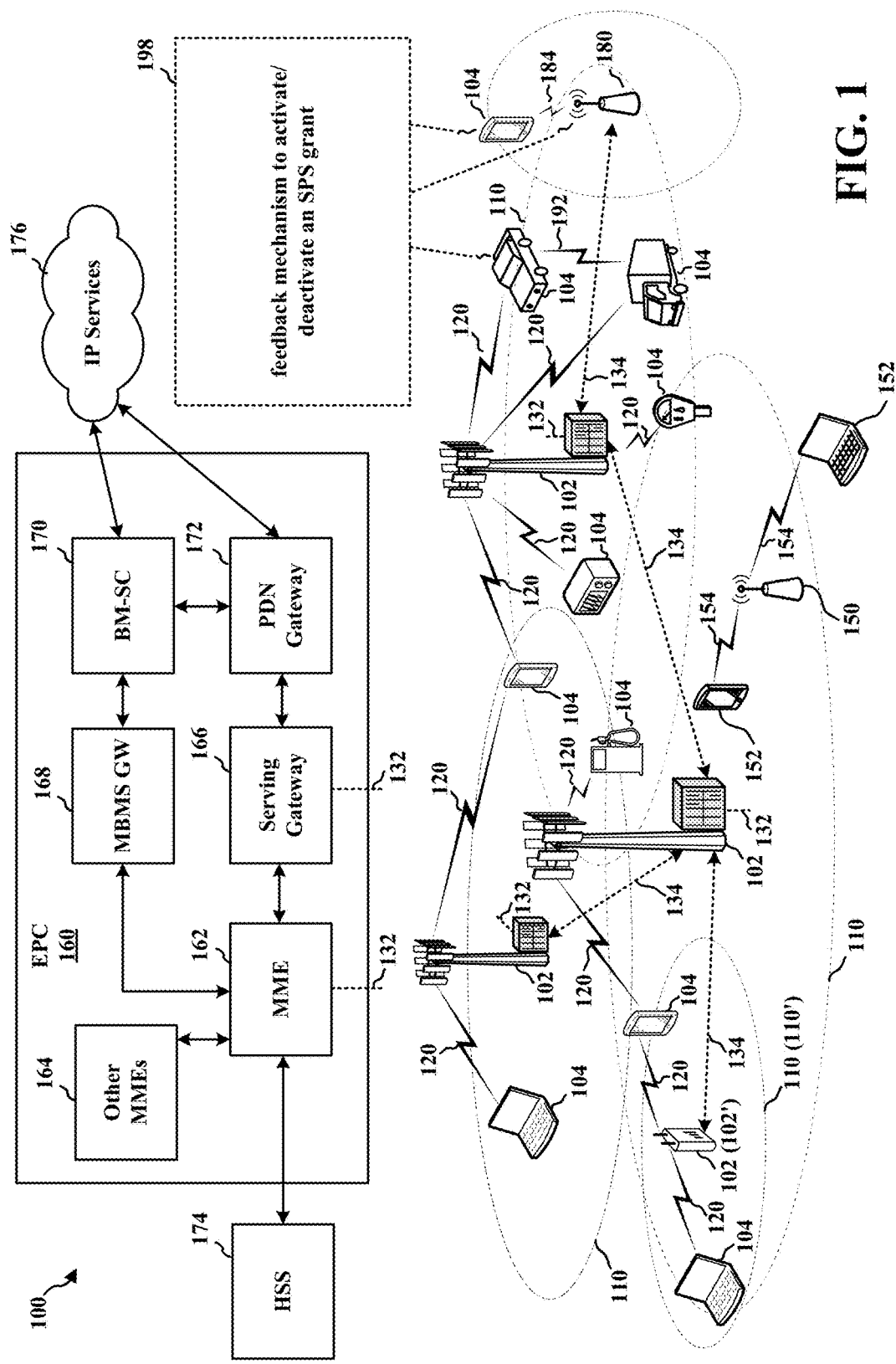
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to provide a feedback mechanism to activate and/or deactivate an SPS grant (198).

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
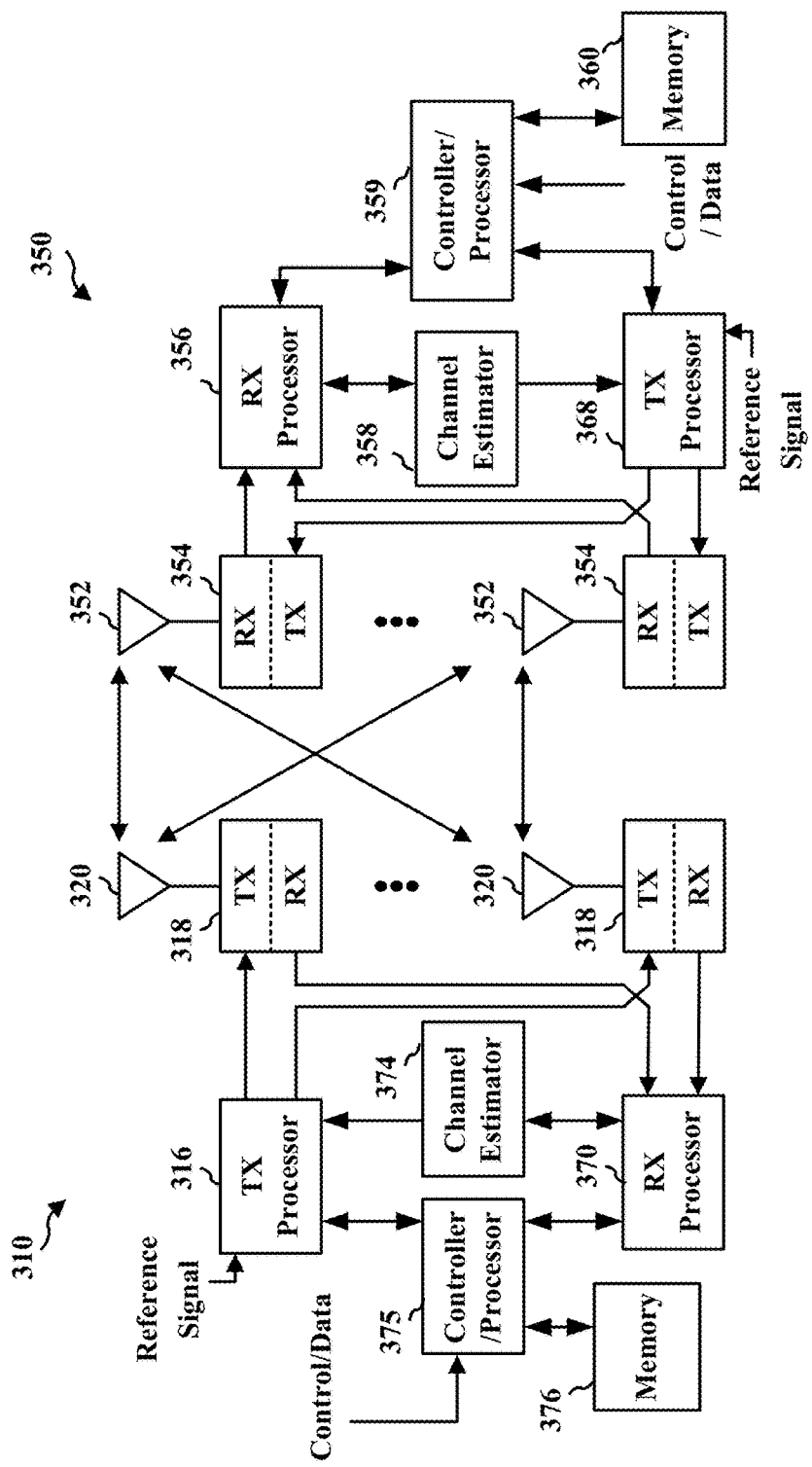
FIG. 3 is a diagram illustrating an example of an evolved Node B (eNB) and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In conventional communication systems, a UE may be allocated resources for UL transmissions through an SPS grant received from a base station. The SPS grant may allocate the resources to the UE with an SPS periodicity. In other words, the UE may use the allocated resources at predetermined intervals (e.g., an SPS periodicity) until the SPS grant is deactivated. When the UE does not have any data to send using the allocated resources, the UE may skip transmitting data (e.g., UL skipping) and also skip sending a feedback PDU using the allocated resources in order to reduce the UL interference of the system. PDUs may include a MAC header, MAC service data units (SDUs), MAC control elements (CEs), padding, etc. When a UE skips sending a feedback PDU, base station implementation may be used to determine if the SPS grant should be deactivated (e.g., the UE does not have any data to send) or if the UE did not receive the SPS grant. Relying on base station implementation to determine if the SPS grant should be deactivated or if the UE did not receive the SPS grant may reduce the reliability of the system.

Conversely, when the UE does have data to transmit using the allocated resources, the UE may transmit a feedback PDU in the form of an acknowledgement. In conventional communications systems, the acknowledgement feedback PDU may be transmitted using the same transmission characteristics as a data transmission associated with the SPS grant. However, by using the same transmission characteristics, the feedback PDU (e.g., acknowledgement) may not be transmitted successfully at the first attempt, and hence may increase the latency of the system due to retransmissions of the feedback PDU.

There is a need for a feedback mechanism to activate and/or deactivate SPS grants, and that also increases the reliability of the system and reduces the latency of the system.

The present disclosure may provide a solution to the problem by providing a feedback mechanism in which a feedback PDU may be transmitted by the UE with modified transmission characteristics for both an activation and deactivation of the SPS grant. Transmitting a feedback PDU with modified transmission characteristics may increase the reliability of the system and reduce the latency of the system, while also activating and/or deactivating SPS grants.

Figure 4A:
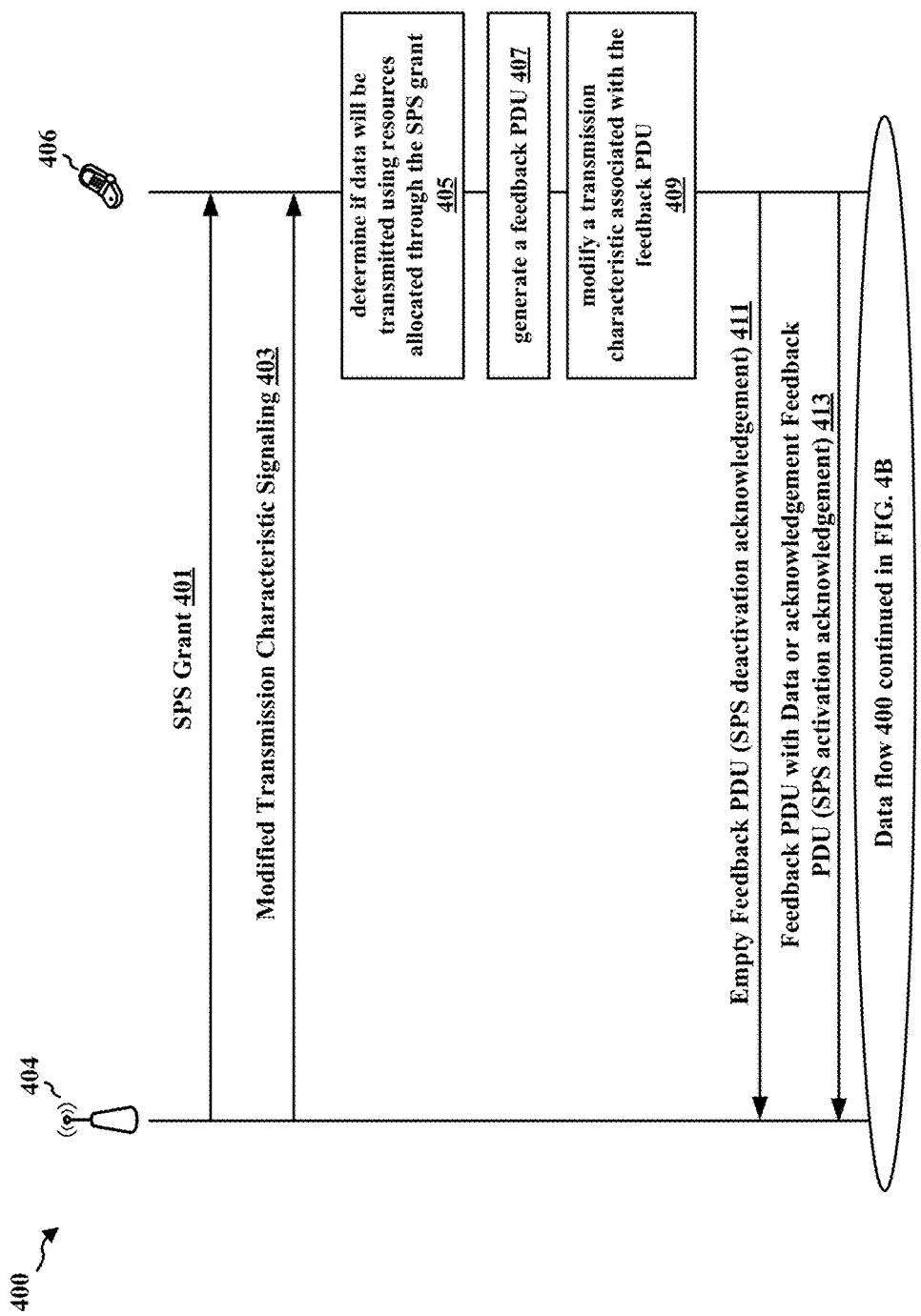
FIGS. 4A and 4B illustrate a data flow that may provide a feedback mechanism for the activation and/or deactivation of an SPS grant in accordance with an aspect of the present disclosure
Figure 4B:
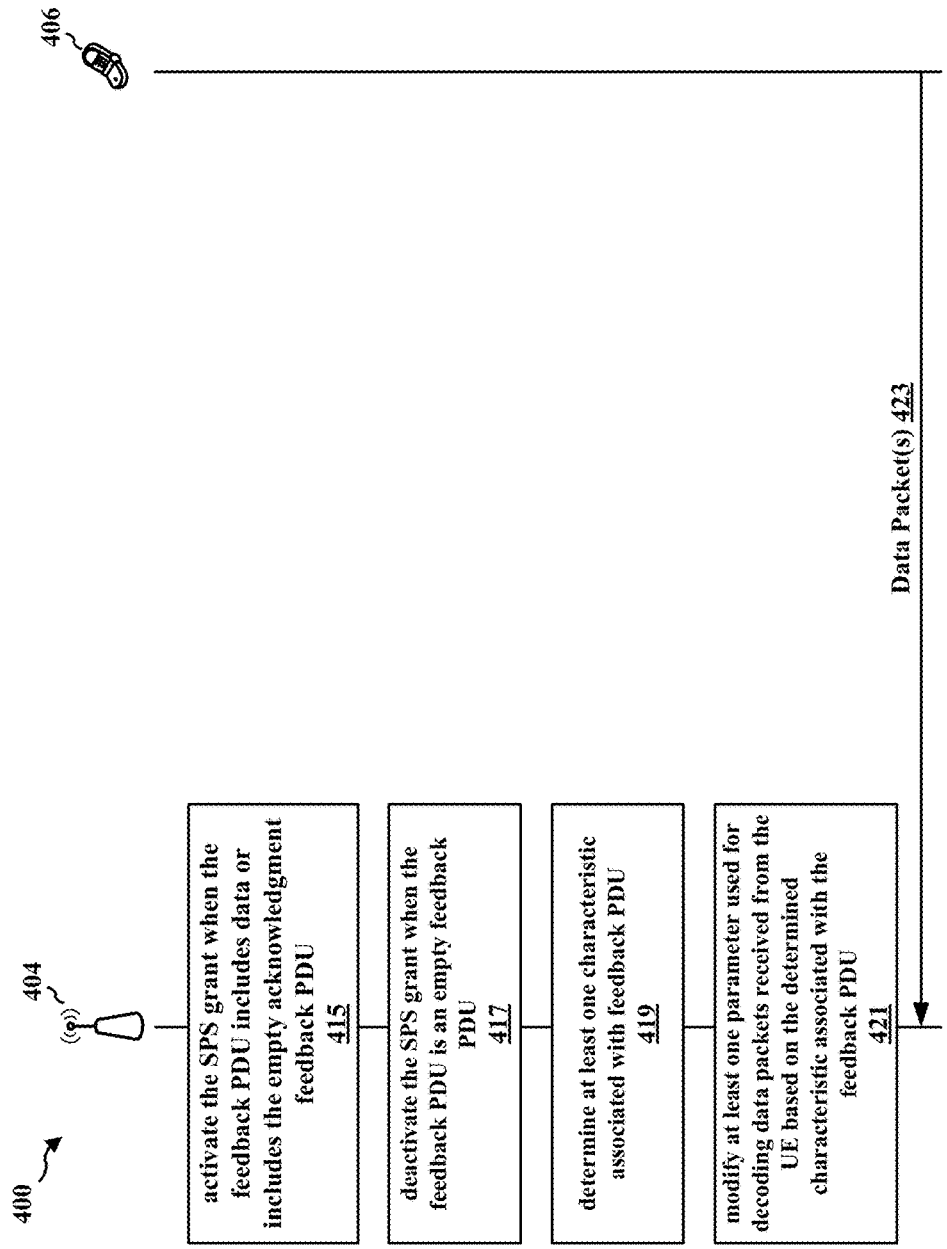

FIGS. 4A and 4B illustrate a data flow 400 that may provide a feedback mechanism for the activation and/or deactivation of an SPS grant in accordance with an aspect of the present disclosure. The data flow 400 may be implanted in a wireless communication system that includes, for example, an base station 404 in communication with a UE 406. base station 404 may correspond to, e.g., base station 102, 180, 650 eNB 310, the apparatus 902/902'. UE 406 may correspond to, e.g., UE 104, 350, 950, apparatus 602/602'.

Referring to FIG. 4A, the base station 404 may transmit an SPS grant 401 to the UE 406. For example, the SPS grant 401 may allocate resources to the UE 406 with an SPS periodicity. In other words, the UE 406 may use the allocated resources at predetermined intervals (e.g., an SPS periodicity at multiple transmission time intervals (TTIs)) to transmit data to the base station 404 until the SPS grant is deactivated. In addition, the base station 404 may transmit signaling 403 associated with a modified transmission characteristic to the UE 406. The signaling 403 may indicate a delta value that is a difference in a transmission characteristic between a feedback PDU transmission and a data transmission using the allocated resources. The modified transmission characteristic may be used by the UE 406 in transmitting a feedback PDU 411, 413 to the base station 404. In a first aspect, the signaling 403 may be transmitted via RRC signaling. In a second aspect, the signaling 403 may be transmitted using a PDCCH associated with the SPS grant 401. In a third aspect, information associated with the modified transmission characteristic may be pre-configured at the UE 406 and the signaling 403 may optionally be omitted.

When the SPS grant 401 is received by the UE 406, the UE 406 may determine 405 if data will be transmitted using resources allocated to the UE 406 through the SPS grant 401. In a first scenario, if the UE 406 determines 405 that data will not be transmitted using resources allocated through the SPS grant 401, the UE 406 may be configured to skip an uplink transmission (e.g., the UE 406 is configured with skipUplinkTxSPS), and the UE 406 may be triggered to generate 407 an empty feedback PDU 411 (e.g., an SPS deactivation acknowledgement). For example, the empty feedback PDU 411 may be a feedback PDU in which all bits are set to zero. In one aspect, the SPS deactivation acknowledgement may be included as a MAC CE of the empty feedback PDU 411 (e.g., feedback PDU without any traffic data) when an uplink grant is configured for the particular TTI in which the UE 406 wants to send the SPS confirmation. In a second scenario, if the UE 406 determines 405 that data will be transmitted using resources allocated through the SPS grant 401, then the UE 406 may generate 407 a feedback PDU 413 (e.g., SPS activation acknowledgement) that includes data or an empty acknowledgement feedback PDU (e.g., an acknowledgement feedback PDU in which all bits are set to zero). The empty acknowledgement feedback PDU may improve decoding reliability at the base station 404. In one aspect, the SPS activation acknowledgement may be included as a MAC CE of the feedback PDU 413 when an uplink grant is configured for the particular TTI in which the UE 406 wants to send the SPS confirmation.

In either the first scenario or the second scenario, the UE 406 may modify 409 a transmission characteristic associated with the feedback PDU 411, 413. For example, the transmission characteristic may be modified based on the signaling 403 received from the base station 404 and/or the information pre-configured at the UE 406, as discussed supra.

In a first example embodiment, the UE 406 may modify 409 the transmission characteristic by increasing a transmit power used for transmitting the feedback PDU 411, 413 in comparison to a transmit power used for a data transmission 423 associated with the SPS grant 401. For example, the transmit power may be modified by a delta value of the PUSCH power used for the feedback PDU 411, 413 in comparison to a PUSCH power to be used for a data transmission associated with the SPS grant 401.

In a second example embodiment, the UE 406 may modify 409 the transmission characteristic by using a smaller TB for the feedback PDU 411, 413 than a TB size used for a data transmission 423 associated with the SPS grant 401. For example, for data transmissions 423 associated with the SPS grant 401, the TB size may be the same for each data transmission 423. In the second example embodiment, the TB size selected for the feedback PDU 411, 413 may be a difference or a ratio (e.g., a delta value) of the TB size used for data transmissions 423. Alternatively, the UE 406 may modify the TB size of the empty feedback PDU 411 such that a smallest TB size that allows transmission of the empty feedback PDU 411 is selected.

In a third example embodiment, the UE 406 may modify 409 the transmission characteristic by using a lower MCS than an MCS used for a data transmission 423 associated with the SPS grant 401. For example, for data transmissions 423 associated with the SPS grant 401, the MCS may be the same for each data transmission 423. In the third example embodiment, the MCS selected for the feedback PDU 411, 413 may be a difference or a ratio (e.g., a delta value) of the MSC used for data transmissions 423. Alternatively, the UE 406 may modify the MCS of the empty feedback PDU 411 such that a smallest MCS that allows transmission of the empty feedback PDU 411 is selected.

In a fourth example embodiment, the UE 406 may modify 409 the transmission characteristic by transmitting the feedback PDU 411, 413 in multiple TTIs. For example, rather than transmitting the feedback PDU 411, 413 using the allocated resources only at a first TTI, the UE 406 may transmit the feedback PDU 411, 413 using allocated resources in the first TTI and one or more subsequent TTIs. The amount of feedback PDU transmission repetition may be indicated in the signaling 403 received by the base station 404 or pre-coded at the UE 406.

In a fifth example embodiment, the UE 406 may modify 409 the transmission characteristic by selecting specific resources for transmitting the feedback PDU 411, 413 that are different than other resources used for transmitting data transmissions 423 associated with the SPS grant 401. The specific resources used for transmitting the feedback PDU 411, 413 may be indicated in the signaling 403 received from the base station 404.

Using at least one of the modified transmission characteristic discussed supra, the UE 406 may transmit the feedback PDU 411, 413 to the base station 404.

Referring to FIG. 4B, when the feedback PDU 411, 413 is received, the base station 404 may activate 415 or deactivate 417 the SPS grant 401. In a first aspect, the base station 404 may activate 415 the SPS grant 401 when the feedback PDU 413 includes data or includes the empty acknowledgment feedback PDU. In a second aspect, the base station 404 may deactivate 417 the SPS grant 401 when the feedback PDU is an empty feedback PDU 411 (e.g., when the UE 406 is configured with skip UplinkTxSPS).

In a further aspect, the base station 404 may determine 419 at least one characteristic associated with the feedback PDU 411, 413. The base station 404 may modify 421 at least one parameter used for decoding data packets 423 received from the UE 406 based on the determined characteristic associated with the feedback PDU.

Using the aspects of the data flow 400 described supra, the present disclosure may be able to provide a feedback mechanism for the activation and/or deactivation of SPS grants that may improve the reliability and reduce the latency of the wireless communication system.

Figure 5:
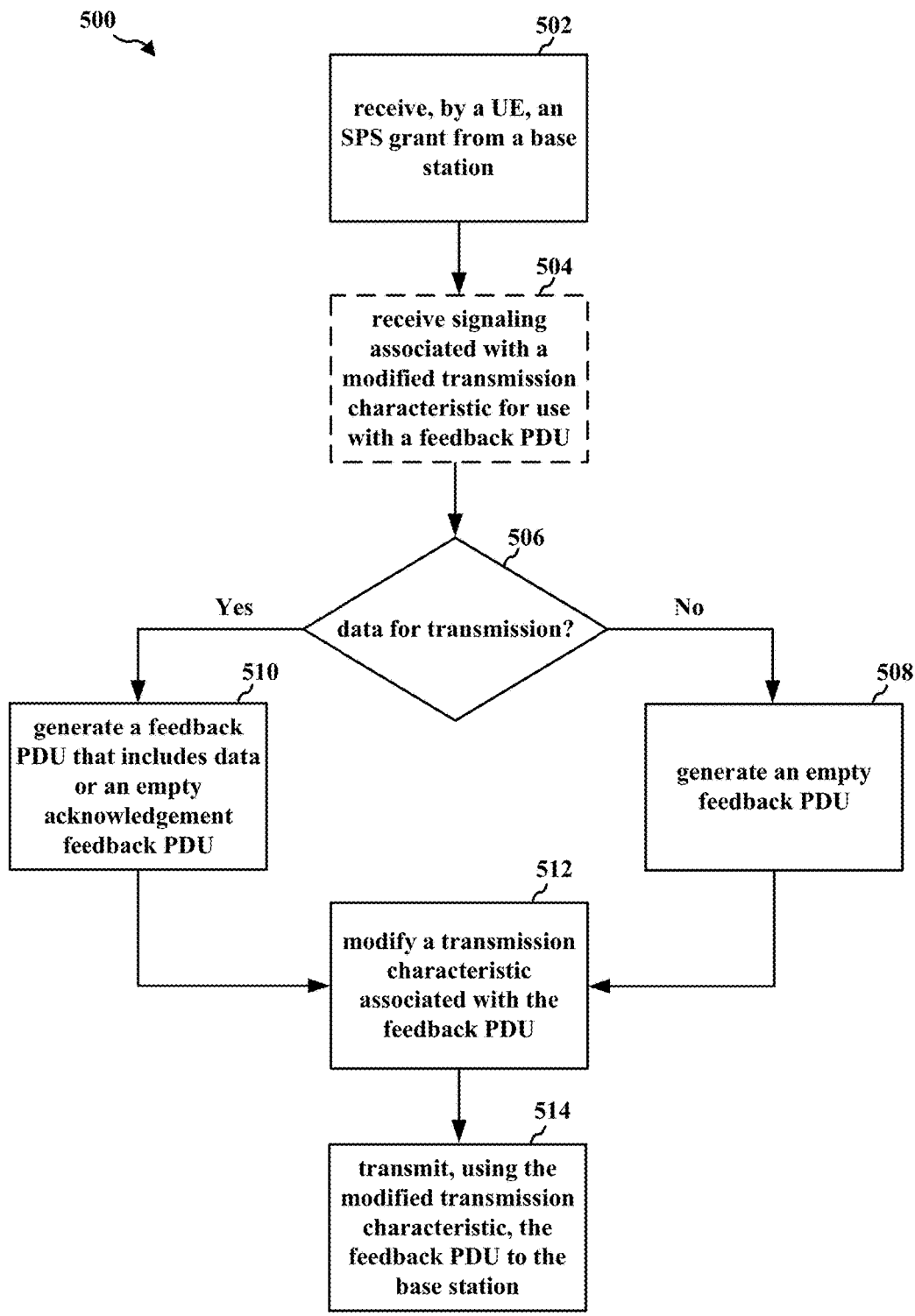
FIG. 5 is a flowchart of a method of wireless communication.

FIG. 5 is a flowchart 500 of a method of wireless communication. The method may be performed by a UE (e.g., the UE 104, 350, 406, 950, apparatus 602/602') in communication with a base station (e.g., the base station 102, 180, 404, 650, eNB 310, the apparatus 902/902'). In FIG. 5, operations indicated with dashed lines may represent optional operations for various aspects of the disclosure.

At 502, the UE may receive an SPS grant from a base station. For example, referring to FIGS. 4A and 4B, the base station 404 may transmit an SPS grant 401 to the UE 406.

For example, the SPS grant may allocate the resources to the UE 406 with an SPS periodicity. In other words, the UE may use the allocated resources at predetermined intervals (e.g., an SPS periodicity at multiple TTIs to transmit data to the base station 404 until the SPS grant is deactivated.

At 504, the UE may receive signaling associated with a modified transmission characteristic for use with a feedback PDU. For example, referring to FIGS. 4A and 4B, the base station 404 may transmit signaling 403 associated with a modified transmission characteristic to the UE 406. The signaling 403 may indicate a delta value that is a difference in a transmission characteristic between a feedback PDU transmission and a data transmission using the allocated resources. The modified transmission characteristic may be used by the UE 406 in transmitting a feedback PDU 411, 413 to the base station 404. In a first aspect, the signaling 403 may be transmitted via RRC signaling. In a second aspect, the signaling 403 may be transmitted in a PDCCH associated with the SPS grant 401.

At 506, the UE may determine if data will be transmitted on one or more resources allocated to the UE through the SPS grant. For example, referring to FIGS. 4A and 4B, when the SPS grant 401 is received by the UE 406, the UE 406 may determine 405 if data will be transmitted using resources allocated to the UE 406 through the SPS grant 401.

At 508, if it is determined that data will not be transmitted on one or more resources allocated to the UE through the SPS grant, then the UE may generate an empty feedback PDU. For example, referring to FIGS. 4A and 4B, if the UE 406 determines 405 that data will not be transmitted using resources allocated through the SPS grant 401, the UE 406 may be configured to skip an uplink transmission (e.g., the UE 406 is configured with skipUplinkTxSPS), and the UE 406 may be triggered to generate 407 an empty feedback PDU 411 (e.g., an SPS deactivation acknowledgement). For example, the empty feedback PDU 411 may be a feedback PDU in which all bits are set to zero. In one aspect, the SPS deactivation acknowledgement may be included as a MAC CE of the empty feedback PDU when an uplink grant is configured for the particular TTI in which the UE 406 wants to send the SPS deactivation acknowledgement.

At 510, if it is determined that data will be transmitted on one or more resources allocated to the UE through the SPS grant, then the UE may generate a feedback PDU that includes data or an empty acknowledgement feedback PDU. For example, referring to FIGS. 4A and 4B, if the UE 406 determines 405 that data will be transmitted using resources allocated through the SPS grant 401, then the UE 406 may generate 407 a feedback PDU 413 (e.g., SPS activation acknowledgement) that includes data or an empty acknowledgement feedback PDU (e.g., an acknowledgement feedback PDU in which all bits are set to zero). The empty acknowledgement feedback PDU may improve decoding reliability at the base station 404. In one aspect, the SPS activation acknowledgement may be included as a MAC CE of the feedback PDU 413 when an uplink grant is configured for the particular TTI in which the UE 406 wants to send the SPS activation acknowledgement.

At 512, the UE may modify a transmission characteristic associated with the feedback PDU. For example, referring to FIGS. 4A and 4B, the UE 406 may modify 409 a transmission characteristic associated with the feedback PDU 411, 413. For example, the transmission characteristic may be modified based on the signaling 403 received from the base station 404 and/or the information coded in the UE 406, as discussed supra.

In a first example embodiment, at 512, the modified transmission characteristic may include an increase in a transmit power used for the feedback PDU in comparison to a transmit power to be used for a data transmission associated with the SPS grant. For example, referring to FIGS. 4A and 4B, UE 406 may modify 409 the transmission characteristic by increasing a transmit power to be used for transmitting the feedback PDU 411, 413 in comparison to a transmit power to be used for a data transmission associated with the SPS grant 401. For example, the transmit power may be modified by a delta value of the PUSCH power used for the feedback PDU 411, 413 in comparison to a PUSCH power to be used for a data transmission associated with the SPS grant 401.

In a second example embodiment, at 512, the modified transmission characteristic may include a smaller TB size used for the empty feedback PDU in comparison to a data transmission associated with the SPS grant. For example, referring to FIGS. 4A and 4B, the UE 406 may modify 409 the transmission characteristic by using a smaller TB for the feedback PDU 411, 413 than a TB size used for a data transmission associated with the SPS grant 401. For example, for data transmissions associated with the SPS grant 401, the TB size may be the same for each data transmission. In the second example embodiment, the TB size selected for the feedback PDU 411, 413 may be a difference or a ratio (e.g., a delta value) of the TB size used for data transmissions using resources allocated by the SPS grant 401. Alternatively, the UE 406 may modify the TB size of the empty feedback PDU 411 such that a smallest TB size that allows transmission of the empty feedback PDU 411 is selected.

In a third example embodiment, at 512, the modified transmission characteristic includes a lower MCS used for the feedback PDU in comparison to a data transmission associated with the SPS grant. For example, referring to FIGS. 4A and 4B, the UE 406 may modify 409 the transmission characteristic by using a lower MCS than an MCS used for a data transmission associated with the SPS grant 401. For example, for data transmissions associated with the SPS grant 401, the MCS may be the same for each data transmission. In the third example embodiment, the MCS selected for the feedback PDU 411, 413 may be a difference or a ratio (e.g., a delta value) of the MSC used for data transmissions using resources allocated by the SPS grant 401. Alternatively, the UE 406 may modify the MCS of the empty feedback PDU 411 such that a smallest MCS that allows transmission of the empty feedback PDU 411 is selected.

In a fourth example embodiment, at 512, the modified transmission characteristic may include receiving the feedback PDU in more than one TTI. For example, referring to FIGS. 4A and 4B, the UE 406 may modify 409 the transmission characteristic by transmitting the feedback PDU 411, 413 in multiple TTIs. For example, rather than transmitting the feedback PDU 411, 413 using the allocated resources only at a first TTI, the UE 406 may transmit the feedback PDU 411, 413 using allocated resources in the first TTI and one or more subsequent TTIs. The amount of feedback PDU transmission repetition may be indicated in the signaling 403 received by the base station 404 or be coded in the UE 406.

In a fifth example embodiment, at 512, the modified transmission parameter includes a specific resource allocation for the feedback PDU that is different than other resources used for a data transmission associated with the SPS grant. For example, referring to FIGS. 4A and 4B, the UE 406 may modify 409 the transmission characteristic by selecting specific resources for transmitting the feedback PDU 411, 413 that are different than other resources used for transmitting data associated with the SPS grant 401. The specific resources used for transmitting the feedback PDU 411, 413 may be indicated in the signaling 403 received from the base station 404.

At 514, the UE may transmit, using the modified transmission characteristic, the feedback PDU to the base station. For example, referring to FIGS. 4A and 4B, using at least one of the modified transmission characteristic discussed supra, the UE 406 may transmit the feedback PDU 411, 413 to the base station 404.

Figure 6:
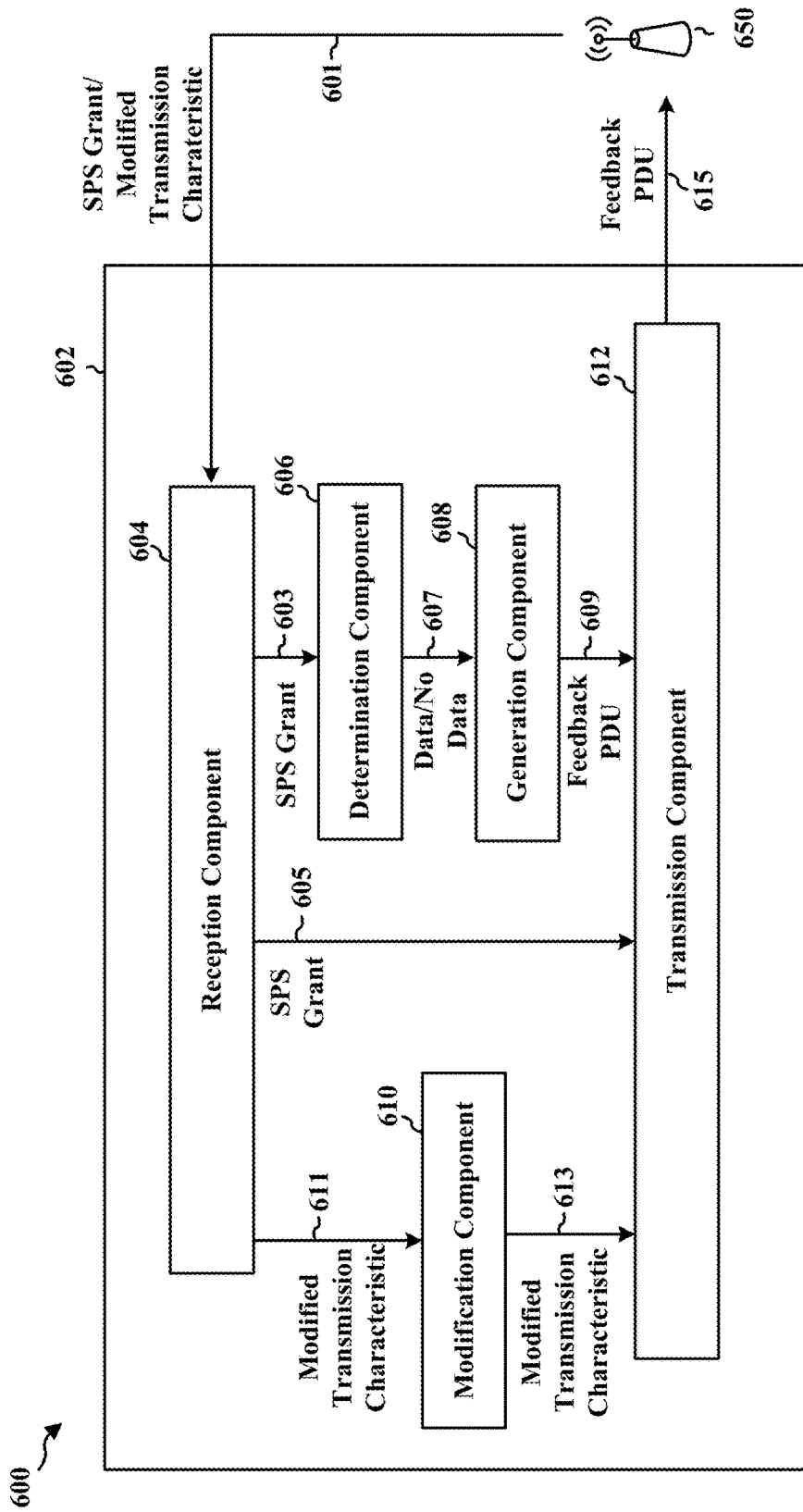
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be a UE (e.g., UE 104, 350, 406, 950, apparatus 602/602') in communication with an base station 650 (e.g., the base station 102, 180, 404, eNB 310, the apparatus 902/902'). The apparatus may include a reception component 604, a determination component 606, a generation component 608, a modification component 610, and a transmission component 612. The reception component 604 may receive an SPS grant 601 that allocates resources to the apparatus for use in transmitting data to the base station 650. The reception component 604 may send a signal 603 associated with the SPS grant to the determination component 606. In addition, the reception component 604 may send a signal 605 associated with the SPS grant to the transmission component 612. Further, the reception component 604 may receive signaling 601 associated with a modified transmission characteristic from the base station 650. In an aspect, the signaling 601 associated with a modified transmission characteristic may be received via RRC signaling. The reception component 604 may send a signal 611 associated with the modified transmission characteristic to the modification component 610. The determination component 606 may determine if there is data to be transmitted using the SPS grant. The determination component 606 may send a signal 607 indicating if there is data to be transmitted using the SPS grant to the generation component 608. The generation component 608 may generate an empty feedback PDU when there is no data to be transmitted using the resources allocated by the SPS grant. Alternatively, the generation component 608 may generate a feedback PDU with data or an empty acknowledgement feedback PDU when there is data to be transmitted using the resources allocated by the SPS grant. In an aspect, the feedback PDU may be generated as an empty PDU (e.g., empty feedback PDU) when it is determined that data will not be transmitted. For example, all bits in the empty feedback PDU may be set to zero. In another aspect, the feedback PDU may be generated to include the data or an empty acknowledgement PDU may be generated when it is determined that data will be transmitted on one or more resources allocated to the UE through the SPS grant. The generation component 608 may send a signal 609 associated with the feedback PDU (e.g., empty feedback PDU, feedback PDU with data, or acknowledgement feedback PDU) to the transmission component 612. The modification component 610 may modify a transmission characteristic associated with the feedback PDU. In a first aspect, the modified transmission characteristic may indicate an increase in a transmit power to be used for the feedback PDU in comparison to a transmit power to be used for a data transmission associated with the SPS grant. In a second aspect, the modified transmission characteristic may indicate a smaller TB size to be used for the feedback PDU in comparison to a TB size to be used for a data transmission associated with the SPS grant. In a third aspect, the modified transmission characteristic may indicate a lower MCS to be used for the feedback PDU in comparison to an MCS to be used for a data transmission associated with the SPS grant. In a fourth aspect, the modified transmission characteristic may indicate an indication to prompt the UE to transmit the feedback PDU in more than one TTI. In a fifth aspect, the modified transmission parameter may indicate using a specific resource allocation for the feedback PDU that is different than other resources used for a data transmission associated with the SPS grant. In addition, the modification component 610 may send a signal 613 associated with the modified transmission characteristic to the transmission component 612. Still further, the transmission component 612 may transmit the feedback PDU 615 using the modified transmission characteristic to the base station 650.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
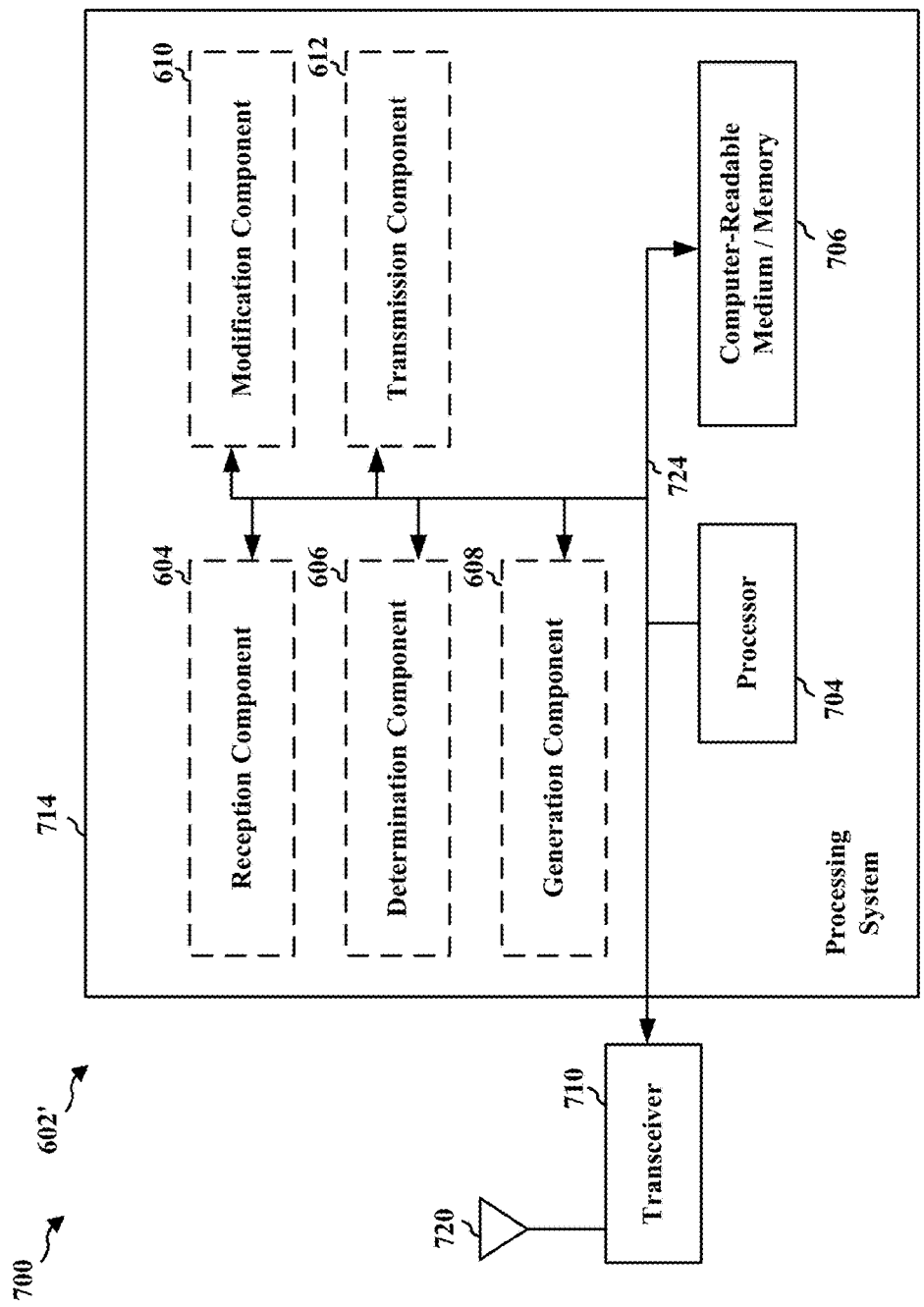
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 612, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359.

In one configuration, the apparatus 602/602' for wireless communication may include means for receiving, by a UE, an SPS grant from a base station. In another configuration, the apparatus 602/602' for wireless communication may include means for receiving signaling associated with the modified transmission characteristic from the base station. In an aspect, the signaling may be received via RRC signaling. In another aspect, the signaling may be received in a PDCCH associated with the SPS grant. In an additional configuration, the apparatus 602/602' for wireless communication may include means for determining that data will not be transmitted on one or more resources allocated to the UE through the SPS grant. In a further configuration, the apparatus 602/602' for wireless communication may include means for determining that data will be transmitted on one or more resources allocated to the UE through the SPS grant. In yet another configuration, the apparatus 602/602' for wireless communication may include means for generating a feedback PDU. In an aspect, the feedback PDU may be generated as an empty PDU when it is determined that data will not be transmitted. For example, all bits in the empty PDU may be set to zero. In another aspect, the feedback PDU may be generated to include the data or an empty acknowledgement PDU is generated when it is determined that data will be transmitted on one or more resources allocated to the UE through the SPS grant. In a further configuration, the apparatus 602/602' for wireless communication may include means for modifying a transmission characteristic associated with the feedback PDU. In a first aspect, the modified transmission characteristic may indicate an increase in a transmit power to be used for the feedback PDU in comparison to a transmit power to be used for a data transmission associated with the SPS grant. In a second aspect, the modified transmission characteristic may indicate a smaller TB size to be used for the feedback PDU in comparison to a TB size to be used for a data transmission associated with the SPS grant. In a third aspect, the modified transmission characteristic may indicate a lower MCS to be used for the feedback PDU in comparison to an MCS to be used for a data transmission associated with the SPS grant. In a fourth aspect, the modified transmission characteristic may indicate an indication to prompt the UE to transmit the feedback PDU in more than one TTI. In a fifth aspect, the modified transmission parameter may indicate using specific resource allocation for the feedback PDU that is different than other resources used for a data transmission associated with the SPS grant. In a further configuration, the apparatus 602/602' for wireless communication may include means for transmitting, using the modified transmission characteristic, the feedback PDU to the base station. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
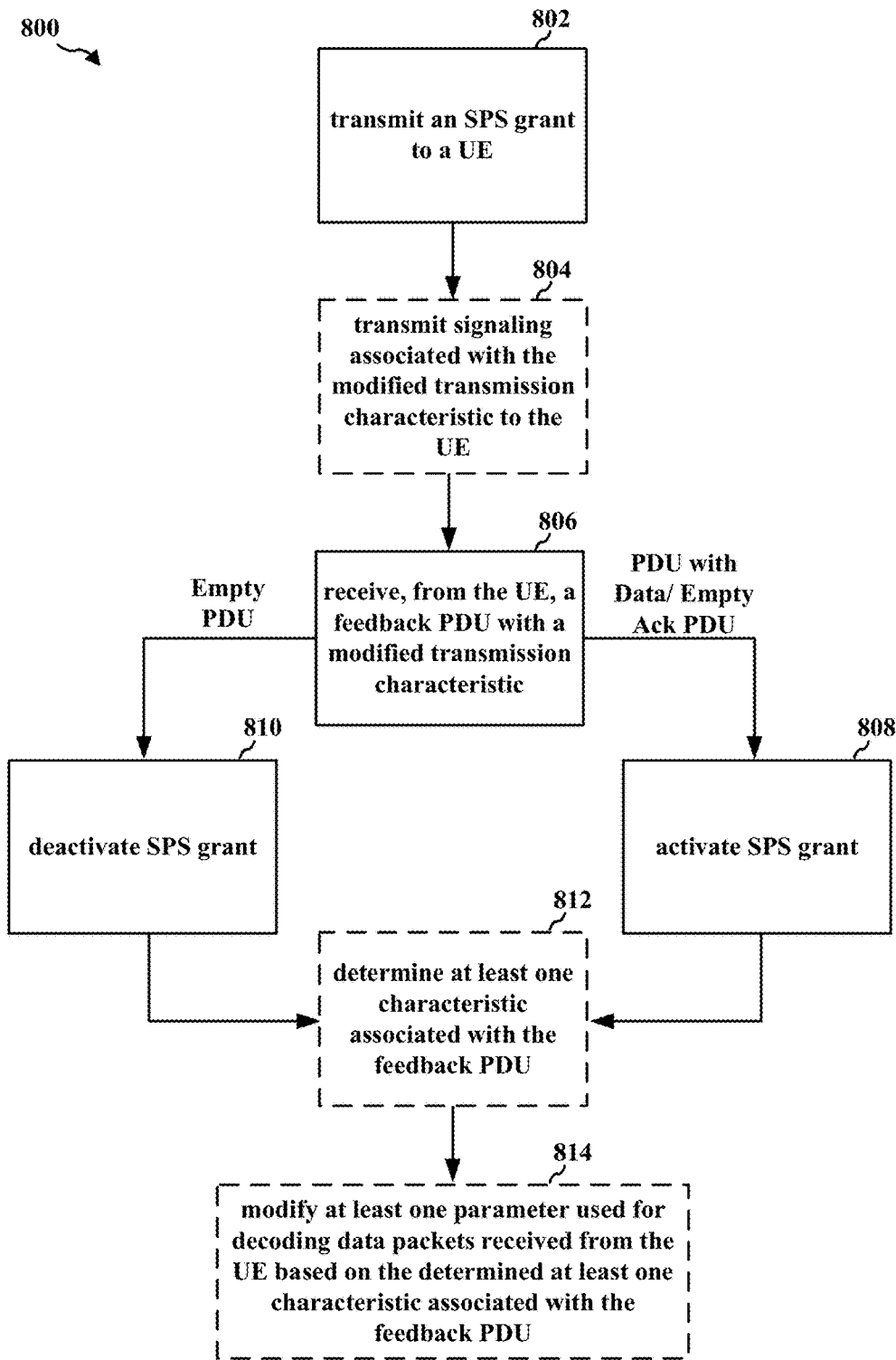
FIG. 8 is a flowchart of a method of wireless communication.

FIG. 8 is a flowchart 800 of a method of wireless communication. The method may be performed by a base station (e.g., the base station 102, 180, 404, 650 eNB 310, the apparatus 902/902') in communication with a UE (e.g., UE 104, 350, 406, 950, apparatus 602/602'). In FIG. 8, operations indicated with dashed lines may represent optional operations for various aspects of the disclosure.

At 802, the base station may transmit an SPS grant to the UE. For example, referring to FIGS. 4A and 4B, the base station 404 may transmit an SPS grant 401 to the UE 406. For example, the SPS grant may allocate the resources to the UE 406 with an SPS periodicity. In other words, the UE may use the allocated resources at predetermined intervals (e.g., an SPS periodicity at multiple transmission time intervals (TTIs)) to transmit data to the base station 404 until the SPS grant is deactivated.

At 804, the base station may transmit signaling associated with the modified transmission characteristic to the UE. For example, referring to FIGS. 4A and 4B, the base station 404 may transmit signaling 403 associated with a modified transmission characteristic to the UE 406. The signaling 403 may indicate a delta value that is a difference in a transmission characteristic between a feedback PDU transmission and a data transmission using the allocated resources. The modified transmission characteristic may be used by the UE 406 in transmitting a feedback PDU 411, 413 to the base station 404. In a first aspect, the signaling 403 may be transmitted via RRC signaling. In a second aspect, the signaling 403 may be transmitted in a PDCCH associated with the SPS grant 401.

At 806, the base station may receive, from the UE, transmission feedback PDU with a modified transmission characteristic. For example, referring to FIGS. 4A and 4B, if the UE 406 determines 405 that data will be transmitted using resources allocated through the SPS grant 401, then the UE 406 may generate 407 a feedback PDU 413 that includes data. In an aspect, the UE 406 may generate 407 an empty feedback PDU 411 even when there is data to send (e.g., an acknowledgement of the SPS grant 401). By setting all of the bits in the feedback PDU 411 to zero, decoding reliability at the base station 404 may be improved. In addition, the UE 406 may modify 409 a transmission characteristic associated with the feedback PDU 411, 413. For example, the transmission characteristic may be modified based on the signaling 403 received from the base station 404 and/or the information coded in the UE 406, as discussed supra.

In a first example embodiment, at 806, the modified transmission characteristic may include an increase in a transmit power used for the feedback PDU in comparison to a transmit power to be used for a data transmission associated with the SPS grant. For example, referring to FIGS. 4A and 4B, UE 406 may modify 409 the transmission characteristic by increasing a transmit power to be used for transmitting the feedback PDU 411, 413 in comparison to a transmit power to be used for a data transmission associated with the SPS grant 401. For example, the transmit power may be modified by a delta value of the PUSCH power used for the feedback PDU 411, 413 in comparison to a PUSCH power to be used for a data transmission associated with the SPS grant 401.

In a second example embodiment, at 806, the modified transmission characteristic may include a smaller TB size used for the empty feedback PDU in comparison to a data transmission associated with the SPS grant. For example, referring to FIGS. 4A and 4B, the UE 406 may modify 409 the transmission characteristic by using a smaller TB for the feedback PDU 411, 413 than a TB size used for a data transmission associated with the SPS grant 401. For example, for data transmissions associated with the SPS grant 401, the TB size may be the same for each data transmission. In the second example embodiment, the TB size selected for the feedback PDU 411, 413 may be a difference or a ratio (e.g., a delta value) of the TB size used for data transmissions using resources allocated by the SPS grant 401. Alternatively, the UE 406 may modify the TB size of the empty feedback PDU 411 such that a smallest TB size that allows transmission of the empty feedback PDU 411 is selected.

In a third example embodiment, at 806, the modified transmission characteristic may include a lower MCS used for the feedback PDU in comparison to a data transmission associated with the SPS grant. For example, referring to FIGS. 4A and 4B, the UE 406 may modify 409 the transmission characteristic by using a lower MCS than an MCS used for a data transmission associated with the SPS grant 401. For example, for data transmissions associated with the SPS grant 401, the MCS may be the same for each data transmission. In the third example embodiment, the MCS selected for the feedback PDU 411, 413 may be a difference or a ratio (e.g., a delta value) of the MSC used for data transmissions using resources allocated by the SPS grant 401. Alternatively, the UE 406 may modify the MCS of the empty feedback PDU 411 such that a smallest MCS that allows transmission of the empty feedback PDU 411 is selected.

In a fourth example embodiment, at 806, the modified transmission characteristic may include receiving the feedback PDU in more than one TTI. For example, referring to FIGS. 4A and 4B, the UE 406 may modify 409 the transmission characteristic by transmitting the feedback PDU 411, 413 in multiple TTIs. For example, rather than transmitting the feedback PDU 411, 413 using the allocated resources only at a first TTI, the UE 406 may transmit the feedback PDU 411, 413 using allocated resources in the first TTI and one or more subsequent TTIs. The amount of feedback PDU transmission repetition may be indicated in the signaling 403 received by the base station 404 or be coded in the UE 406.

In a fifth example embodiment, at 806, the modified transmission parameter includes a specific resource allocation for the feedback PDU that is different than other resources used for a data transmission associated with the SPS grant. For example, referring to FIGS. 4A and 4B, the UE 406 may modify 409 the transmission characteristic by selecting specific resources for transmitting the feedback PDU 411, 413 that are different than other resources used for transmitting data associated with the SPS grant 401. The specific resources used for transmitting the feedback PDU 411, 413 may be indicated in the signaling 403 received from the base station 404.

At 808, if the feedback PDU received from the UE includes data or an empty acknowledgement feedback PDU is received, then the base station may activate the SPS grant. For example, referring to FIGS. 4A and 4B, the base station 404 may activate 415 the SPS grant 401 when the feedback PDU 413 includes data or when an empty feedback PDU is received.

At 810, if the feedback PDU received from the UE does not include data, then the base station may deactivate the SPS grant. For example, referring to FIGS. 4A and 4B, the base station 404 may deactivate 417 the SPS grant 401 when the feedback PDU is an empty feedback PDU 411.

At 812, the base station may determine at least one characteristic associated with feedback PDU. For example, referring to FIGS. 4A and 4B, the base station 404 may determine 419 at least one characteristic associated with feedback PDU 411, 413.

At 814, the base station may modify at least one parameter used for decoding data packets received from the UE based on the determined at least one characteristic associated with the feedback PDU. For example, referring to FIGS. 4A and 4B, the base station 404 may modify 421 at least one parameter used for decoding data packets 423 received from the UE 406 based on the determined characteristic associated with the feedback PDU.

Figure 9:
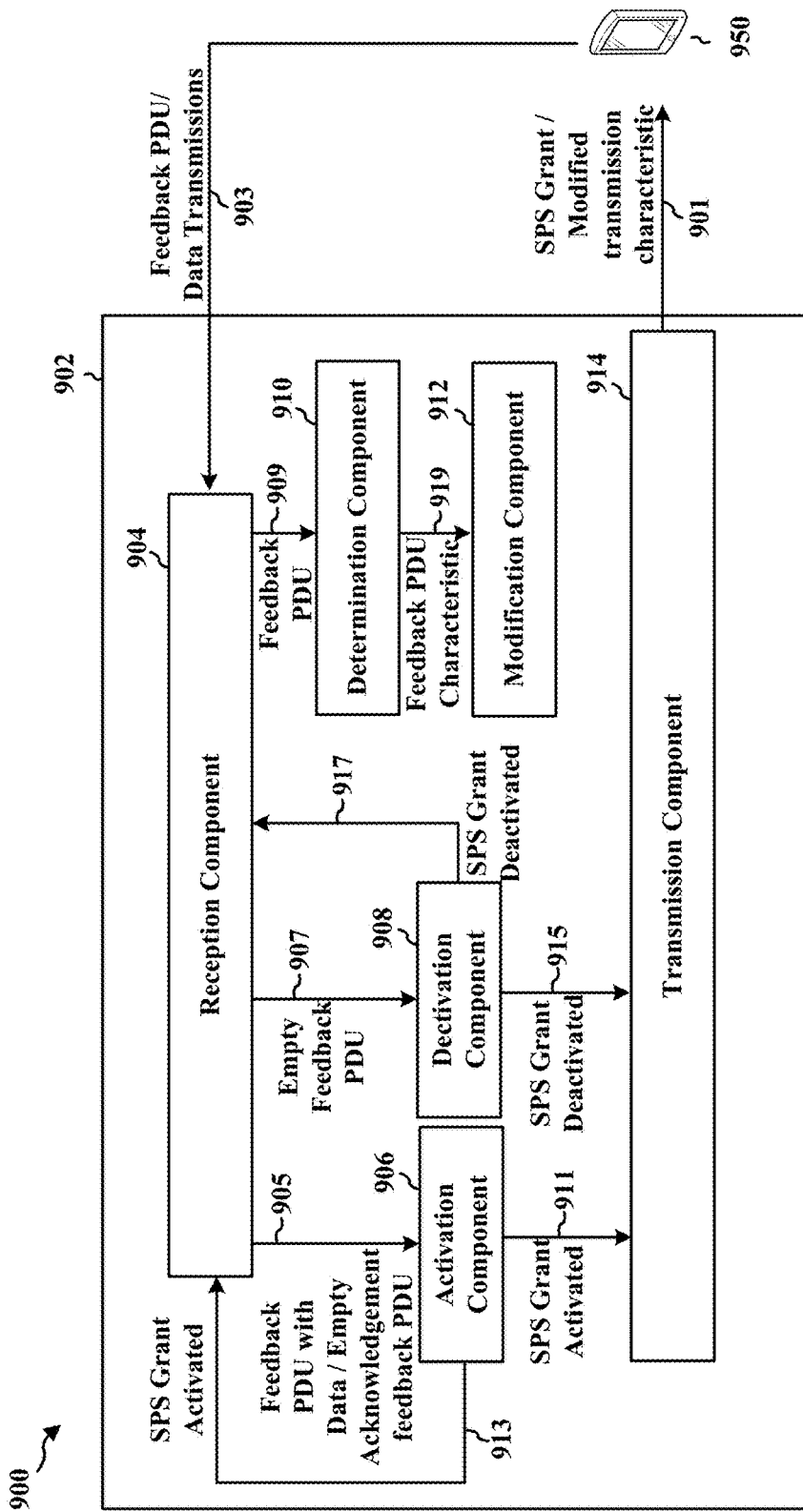
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a base station (e.g., the base station 102, 180, 404, 650, eNB 310, the apparatus 902/902') in communication with a UE 950 (e.g., UE 104, 350, 406, apparatus 602/602'). The apparatus may include a reception component 904, an activation component 906, a deactivation component 908, a determination component 910, a modification component 912, and a transmission component 914. The transmission component 914 may transmit an SPS grant 901 allocating resources for the UE 950 to use in sending data transmissions (e.g. data packets) to the apparatus. In addition, the transmission component 914 may transmit signaling 901 that indicates a modified transmission characteristic for the UE 950 to use when sending one or more feedback PDUs. In an aspect, the modified transmission characteristic may be transmitted via RRC signaling. In another aspect, the signaling 901 associated with the modified transmission characteristic may be transmitted using a PDCCH associated with the SPS grant. In a first aspect, the signaling 901 associated with the modified transmission characteristic may indicate an increase in a transmit power used for the feedback PDU in comparison to a transmit power to be used for a data transmission associated with the SPS grant. In a second aspect, the signaling 901 associated with the modified transmission characteristic may indicate a smaller TB size used for the empty feedback PDU in comparison to a data transmission associated with the SPS grant. In a third aspect, the signaling 901 associated with the modified transmission characteristic may indicate a lower MCS used for the feedback PDU in comparison to a data transmission associated with the SPS grant. In a fourth aspect, the signaling 901 associated with the modified transmission characteristic may indicate receiving the feedback PDU in more than one TTI. In a fifth aspect, the signaling 901 associated with the modified transmission parameter may indicate a specific resource allocation for the feedback PDU that may be different than other resources used for a data transmission associated with the SPS grant. The reception component 904 may receive a feedback PDU 903 with a modified transmission characteristic from UE 950. For example, the feedback PDU 903 may include an empty feedback PDU in which all bits are set to zero, an empty acknowledgement feedback PDU, or a feedback PDU with data. When the feedback PDU 903 includes a feedback PDU with data or an empty acknowledgement feedback PDU, the reception component 904 may send a signal 905 associated with the feedback PDU with data or the empty acknowledgement feedback PDU to the activation component 906. Alternatively, when the feedback PDU 903 includes an empty PDU, the reception component 904 may send a signal 907 associated with the empty feedback PDU to the deactivation component 908. In addition, whether the feedback PDU 903 is a feedback PDU with data or an empty feedback PDU, the reception component 904 may send a signal 909 associated with the feedback PDU to the determination component 910. The activation component 906 may activate the SPS grant when the feedback PDU includes data or is an empty acknowledgement feedback PDU. The activation component 906 may send a signal 911, 913 indicating the SPS grant is activated to the transmission component 914 and/or the reception component 904. In addition, the deactivation component 908 may deactivate the SPS grant when the feedback PDU is an empty feedback PDU. The deactivation component 908 may send a signal 915, 917 indicating that the SPS grant is deactivated to the transmission component 914 and/or the reception component 904. Furthermore, the determination component 910 may determine at least one characteristic associated with the feedback PDU. In addition, the determination component 910 may send a signal 919 associated with the at least one characteristic associated with the feedback PDU. The modification component 912 that modifies at least one parameter used for decoding data transmissions received from the UE 950 based on the determined at least one characteristic associated with the feedback PDU.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
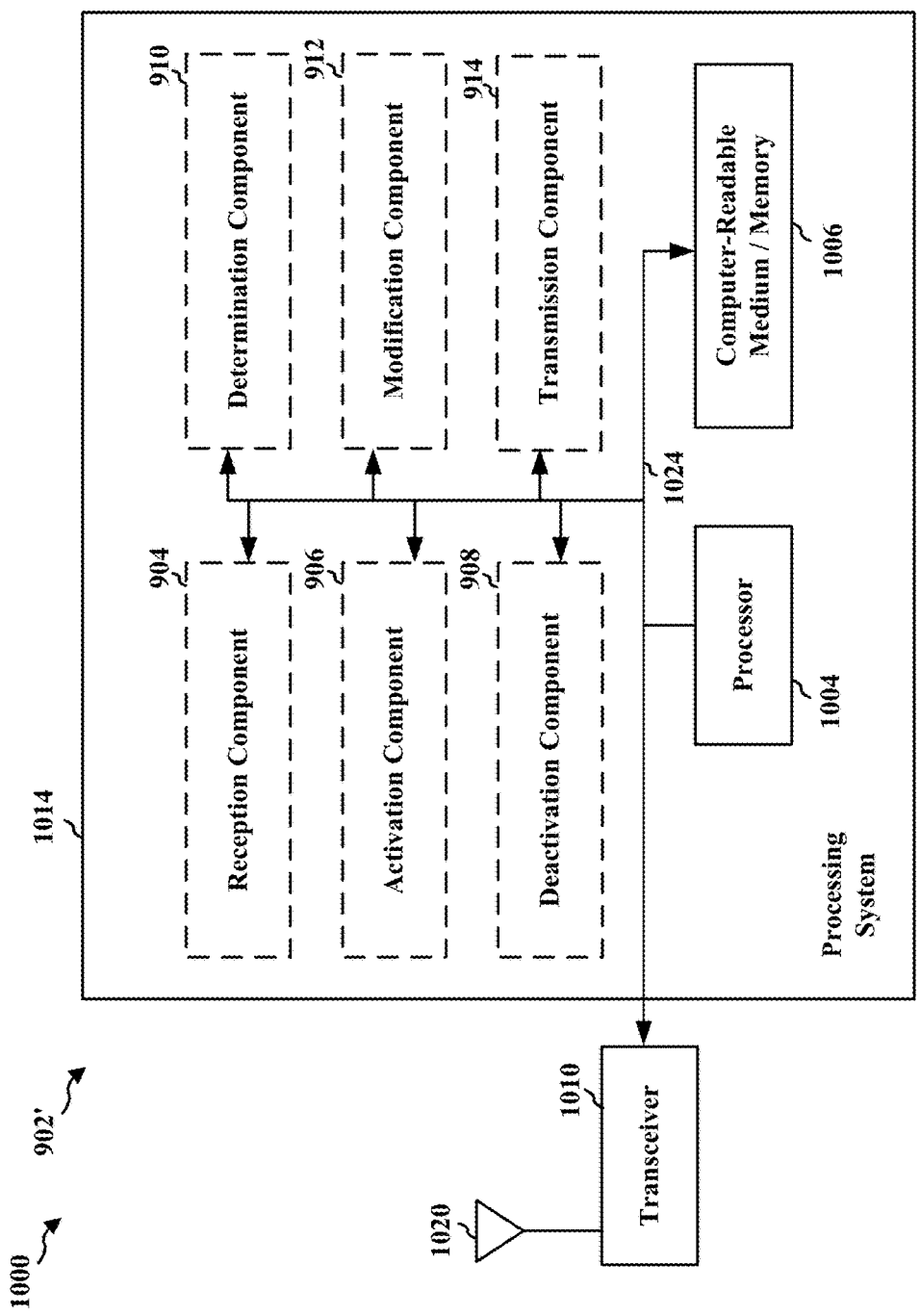
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 914, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914. The components may be software components running in the processor 1004, resident/stored in the computer readable medium/memory 1006, one or more hardware components coupled to the processor 1004, or some combination thereof. The processing system 1014 may be a component of the eNB 310 and may include the memory 376 and/or at least one of the TX processor 316, the RX processor 370, and the controller/processor 375.

In one configuration, the apparatus 902/902' for wireless communication may include means for transmitting an SPS grant to a UE. In another configuration, the apparatus 902/902' for wireless communication may include means for transmitting signaling associated with a modified transmission characteristic to the UE. In an aspect, the modified transmission characteristic may be transmitted via RRC signaling. In another aspect, the signaling may be transmitted using a PDCCH associated with the SPS grant. In a further configuration, the apparatus 902/902' for wireless communication may include means for receiving, from the UE, a feedback PDU with a modified transmission characteristic. For example, the feedback PDU may include an empty feedback PDU in which all bits are set to zero, an empty acknowledgement feedback PDU, or a feedback PDU with data. In a first aspect, the modified transmission characteristic may indicate an increase in a transmit power used for the feedback PDU in comparison to a transmit power to be used for a data transmission associated with the SPS grant. In a second aspect, the modified transmission characteristic may indicate a smaller TB size used for the empty feedback PDU in comparison to a data transmission associated with the SPS grant. In a third aspect, the modified transmission characteristic may indicate a lower MCS used for the feedback PDU in comparison to a data transmission associated with the SPS grant. In a fourth aspect, the modified transmission characteristic may indicate receiving the feedback PDU in more than one TTI. In a fifth aspect, the modified transmission parameter may indicate a specific resource allocation for the feedback PDU that may be different than other resources used for a data transmission associated with the SPS grant. In yet another configuration, the apparatus 902/902' for wireless communication may include means for activating or means for deactivating the SPS grant when the feedback PDU is received. In a further configuration, the apparatus 902/902' for wireless communication may include means for deactivating the SPS grant when the feedback PDU is an empty PDU. In yet a further configuration, the apparatus 902/902' for wireless communication may include means for activating the SPS grant when the feedback PDU includes data or includes an empty acknowledgement PDU. In an additional configuration, the apparatus 902/902' for wireless communication may include means for determining at least one characteristic associated with feedback PDU. In one configuration, the apparatus 902/902' for wireless communication further may include means for modifying at least one parameter used for decoding data packets received from the UE based on the determined at least one characteristic associated with the feedback PDU. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving, by a user equipment (UE), a semi-persistent scheduling (SPS) grant from a base station;
   generating a feedback protocol data unit (PDU) including an SPS activation acknowledgement or an SPS deactivation acknowledgement;
   modifying a transmission characteristic associated with the feedback PDU, wherein the modified transmission characteristic includes at least one of a first transmit power, a transport block (TB) size, or a modulation and coding scheme (MCS); and
   transmitting, using the modified transmission characteristic, the feedback PDU to the base station to improve a feedback mechanism for activating or deactivating the SPS grant.

2. The method of claim 1, further comprising:
   determining that data will not be transmitted on one or more resources allocated to the UE through the SPS grant.

3. The method of claim 2, wherein the feedback PDU is generated as an empty PDU in response to the UE determining that the data will not be transmitted.

4. The method of claim 3, wherein all bits in the empty PDU are set to zero.

5. The method of claim 1, further comprising:
   determining that data will be transmitted on one or more resources allocated to the UE through the SPS grant.

6. The method of claim 5, wherein the feedback PDU is generated to include the data or the feedback PDU is generated as an empty acknowledgement feedback PDU.

7. The method of claim 1, further comprising:
   receiving signaling associated with the modified transmission characteristic from the base station.

8. The method of claim 7, wherein the signaling is received via radio resource control (RRC) signaling.

9. The method of claim 7, wherein the signaling is received in a physical downlink control channel (PDCCH) associated with the SPS grant.

10. The method of claim 1, wherein the modified transmission characteristic includes an increase in the first transmit power to be used for the feedback PDU in comparison to a second transmit power to be used for a data transmission associated with the SPS grant.

11. The method of claim 1, wherein the modified transmission characteristic includes decreasing the smaller TB size to be used for the feedback PDU in comparison to a larger TB size to be used for a data transmission associated with the SPS grant.

12. The method of claim 1, wherein the modified transmission characteristic includes lowering the MCS to be used for the feedback PDU in comparison to a higher MCS to be used for a data transmission associated with the SPS grant.

13. The method of claim 1, wherein the modified transmission characteristic further includes an indication to prompt the UE to transmit the feedback PDU in more than one transmission time intervals (TTIs).

14. The method of claim 1, wherein the modified transmission parameter further includes using a specific resource allocation for the feedback PDU that are different than other resources used for a data transmission associated with the SPS grant.

15. A method of wireless communication, comprising:
    transmitting a semi-persistent scheduling (SPS) grant to a user equipment (UE);
    receiving, from the UE, a feedback PDU with a modified transmission characteristic, wherein the feedback PDU includes an SPS activation acknowledgement or an SPS deactivation acknowledgement, wherein the modified transmission characteristic includes at least one of a first transmit power, a transport block (TB) size, or a modulation and coding scheme (MCS); and
    activating or deactivating the SPS grant when the feedback PDU is received.

16. The method of claim 15, wherein the feedback PDU is an empty PDU, the method further comprising:

deactivating the SPS grant when the feedback PDU is an empty PDU.

17. The method of claim 16, wherein all bits in the empty PDU are set to zero.

18. The method of claim 15, wherein the feedback PDU includes data, the method further comprising:
activating the SPS grant when the feedback PDU includes the data or when the feedback PDU is an empty acknowledgement feedback PDU.

19. The method of claim 15, further comprising:
transmitting signaling associated with the modified transmission characteristic to the UE.

20. The method of claim 19, wherein the modified transmission characteristic is transmitted via radio resource control (RRC) signaling.

21. The method of claim 19, wherein the signaling is transmitted using a physical downlink control channel (PDCCH) associated with the SPS grant.

22. The method of claim 15, wherein the modified transmission characteristic includes an increase in the first transmit power used for the feedback PDU in comparison to a second transmit power to be used for a data transmission associated with the SPS grant.

23. The method of claim 15, wherein the modified transmission characteristic includes decreasing the TB size to be used for the feedback PDU in comparison to a larger TB size to be used for a data transmission associated with the SPS grant.

24. The method of claim 15, wherein the modified transmission characteristic includes lowering the MCS to be used for the feedback PDU in comparison to a higher MCS to be used for a data transmission associated with the SPS grant.

25. The method of claim 15, wherein the modified transmission characteristic further includes receiving the feedback PDU in more than one transmission time intervals (TTIs).

26. The method of claim 15, wherein the modified transmission parameter further includes a specific resource allocation for the feedback PDU that is different than other resources used for a data transmission associated with the SPS grant.

27. The method of claim 15, further comprising:
determining at least one characteristic associated with feedback PDU; and
modifying at least one parameter used for decoding data packets received from the UE based on the determined at least one characteristic associated with the feedback PDU.

28. An apparatus for wireless communication, comprising:
a memory; and
at least one processor coupled to the memory and configured to:
receive, by a user equipment (UE), a semi-persistent scheduling (SPS) grant from a base station;
generate a feedback protocol data unit (PDU) including an SPS activation acknowledgement or an SPS deactivation acknowledgement;
modify a transmission characteristic associated with the feedback PDU, wherein the modified transmission characteristic includes at least one of a first transmit power, a transport block (TB) size, or a modulation and coding scheme (MCS); and
transmit, using the modified transmission characteristic, the feedback PDU to the base station to improve a feedback mechanism for activating or deactivating the SPS grant.

29. The apparatus of claim 28, wherein the at least one processor is further configured to:
receive signaling associated with the modified transmission characteristic from the base station.

30. An apparatus for wireless communication, comprising:
a memory; and
at least one processor coupled to the memory and configured to:
transmit a semi-persistent scheduling (SPS) grant to a user equipment (UE);
receive, from the UE, a feedback PDU with a modified transmission characteristic, wherein the feedback PDU includes an SPS activation acknowledgement or an SPS deactivation acknowledgement, wherein the modified transmission characteristic includes at least one of a first transmit power, a transport block (TB) size, a modulation and coding scheme (MCS); and
activate or deactivate the SPS grant when the feedback PDU is received.

* * * * *